United States Patent [19]
Henning et al.

[11] Patent Number: 5,227,624
[45] Date of Patent: Jul. 13, 1993

[54] OPTICAL SENSING SYSTEMS WITH PLURAL WAVELENGTHS AND WAVELENGTH SENSITIVE SENSORS

[75] Inventors: Michael L. Henning, Shepton Mallet; Philip J. Nash, Sherborne, both of United Kingdom

[73] Assignee: GEC-Marconi Limited, Stanmore, England

[21] Appl. No.: 798,712

[22] Filed: Nov. 29, 1991

[30] Foreign Application Priority Data

Dec. 6, 1990 [GB] United Kingdom ............... 9026588

[51] Int. Cl.$^5$ .............................................. H01J 5/16
[52] U.S. Cl. ................................ 250/227.23; 250/226
[58] Field of Search ............... 250/227.12, 227.14, 250/227.15, 227.18, 227.23, 226; 385/12, 15, 24

[56] References Cited

U.S. PATENT DOCUMENTS

| | | | |
|---|---|---|---|
| 4,506,153 | 3/1985 | Ohno | 250/227.23 |
| 4,653,916 | 3/1987 | Henning et al. | |
| 4,775,216 | 10/1988 | Layton | 250/227.12 |
| 4,825,424 | 4/1989 | Lamb et al. | |
| 4,888,480 | 12/1989 | Dakin et al. | 250/227.23 |
| 4,904,864 | 2/1990 | Dakin et al. | 250/227.18 |

FOREIGN PATENT DOCUMENTS

| | | |
|---|---|---|
| 1540907 | 2/1979 | United Kingdom . |
| 2136113 | 9/1984 | United Kingdom . |
| 2184231 | 6/1987 | United Kingdom . |

*Primary Examiner*—David C. Nelms
*Attorney, Agent, or Firm*—Spencer, Frank & Schneider

[57] ABSTRACT

An optical sensing system (e.g. hydrophone) includes a plurality of laser light sources for producing light signals of different frequencies which are combined by a Bragg cell and launched into a single optical fibre leading to an optical sensor array arrangement. This sensor array arrangement includes a plurality of optical sensors separated by redirecting means for redirecting light signals along an optical fibre in time displaced relationship to an optical detector.

33 Claims, 4 Drawing Sheets

OPTICAL SENSING SYSTEMS WITH PLURAL WAVELENGTHS AND WAVELENGTH SENSITIVE SENSORS

BACKGROUND OF THE INVENTION

This invention relates to optical sensing systems and relates more specifically but not exclusively to reflectometric sensing systems in which light signals are arranged to be transmitted along an optical sensor array as may be provided by an array of optical fibre sensing elements defined by a plurality of partially-reflective discontinuities (e.g. reflective optical fibre and splices) so that small proportions of the light signals propagating along the sensor array are reflected back along the array and interfere with the light reflected from preceding optical sensors of the array. However the same result may be achieved by having partially transmissive couplers for coupling the signal to a return fibre. Changes in length or deformation of optical fibre sensing elements located between discontinuities due, for example, to the impingement thereon of acoustic pressure waves in the case of hydrophones, produce phase modulation of the propagating light signals and such phase modulation detected in the reflected or redirected signals can be utilised for determining the incident acoustic pressure etc.

Some interferometric sensing systems have hitherto utilised wavelength division multiplexing techniques in which light signals of different wavelengths are transmitted along the optical fibre sensor array but such techniques are effectively ruled out for large arrays of interferometric sensors because of the requirement for a large number of coherent light sources of slightly different wavelengths and of associated narrow band optical couplers and other requisite optical components.

Other interferometric sensing systems have utilised time division multiplexing techniques but in this case the number of sensing elements in the optical fibre sensor is limited by the optical loss suffered by light signals as they propaqate along the sensor array and also by the sampling rate of the reflected light signals which is directly related to the number of sensing elements.

The present invention is directed to an optical sensing system which combines the techniques of wavelength division multiplexing and time division muiplexing in order to increase the multiplexing gain and enhance the overall system performance.

BRIEF SUMMARY OF THE INVENTION

According to the present invention there is provided an optical sensing system comprising a plurality of coherent light sources for producing light signals of different wavelengths (w1, w2), means for combining and launching the light signals of different wavelengths into a single optical fibre leading to an optical sensor array arrangement which consists of a plurality of optical sensors separated by redirecting means for directing light signals propagating along the sensor array arrangement along an optical fibre in time displaced relationship to an optical detector arrangement, wherein different redirecting means are associated with light signals from different sources.

In carrying out the present invention the optical sensor array arrangement may comprise two similar arrays connected in parallel into which light signals of respective wavelengths are directed from the single optical fibre by a wavelength dependent optical coupler.

Alternatively, the optical sensor array arrangement may comprise a single array consisting of a plurality of optical sensors connected in series and divided into two parts with the sensors of one part being separated by redirecting means which only redirect light signals of one wavelength but allow continued propagation along the fibre of the light signals of the other wavelength with low loss, and with the sensors of the other part being separated by redirecting means which redirect light signals of said other wavelength.

In yet another arrangement the optical sensor array arrangement comprises a single array consisting of a plurality of optical sensors which are alternately separated by redirecting means alternate ones of which redirect light signals of the different wavelengths but which allow continued propagation along the fibre of light signals of the other wavelength with low loss.

The above arrangements enable signals of different wavelength to be transmitted by a single fibre to a plurality of sensors such that the corresponding signals of different wavelength returned from the sensors are associated with respective sets of sensors, thereby maximising the number of sensors that can be deployed by reducing the problems associated with attenuation and sampling rate encountered with previous arrangements.

The means for combining and launching the light signals of different wavelengths derived from the light sources into the single optical fibre may comprise a Bragg cell which produces different deflections of input light signals at different wavelengths which are then combined into the single optical fibre by means of a wavelength dependent optical coupler. The use of the Bragg cell allows the use of pulse-pairs with frequency shifting.

Alternatively, the means for combining and launching the light signals of different wavelengths into the single optical fibre may comprise a Bragg cell which is arranged to be pulsed sequentially at different predetermined frequencies in order to produce an equal light deflection of incoming light signals at different wavelengths.

These functions can also be performed using electro-optical devices (integrated optics) or by a combination of Bragg cells and frequency shifters and integrated optic devices either passive or electro-optic.

The redirecting means preferably comprises partial reflectors for reflecting light signals back along the single optical fibre to the detector arrangement, and these partial reflectors may comprise reflective optical couplers. This requires only a single optical fibre to be connected to the sensor array. Preferably the reflected signals are picked-off the return path to the Bragg cell by pick-off coupler means which convey the reflected signals to the optical detector arrangement.

In an alternative embodiment the redirecting means may comprise optical coupling means for redirecting light to an optical fibre other than said single optical fibre for transmission to the optical detector arrangement.

By way of example only the present invention will now be described with reference to the accompanying drawings in which:

BRIEF DESCRIPTION OF THE DRAWINGS

FIGS. 1a, 2a and 3a illustrate modifications of the embodiments shown in FIGS. 1, 2 and 3, respectively.

DETAILED DESCRIPTION

Figure 1:
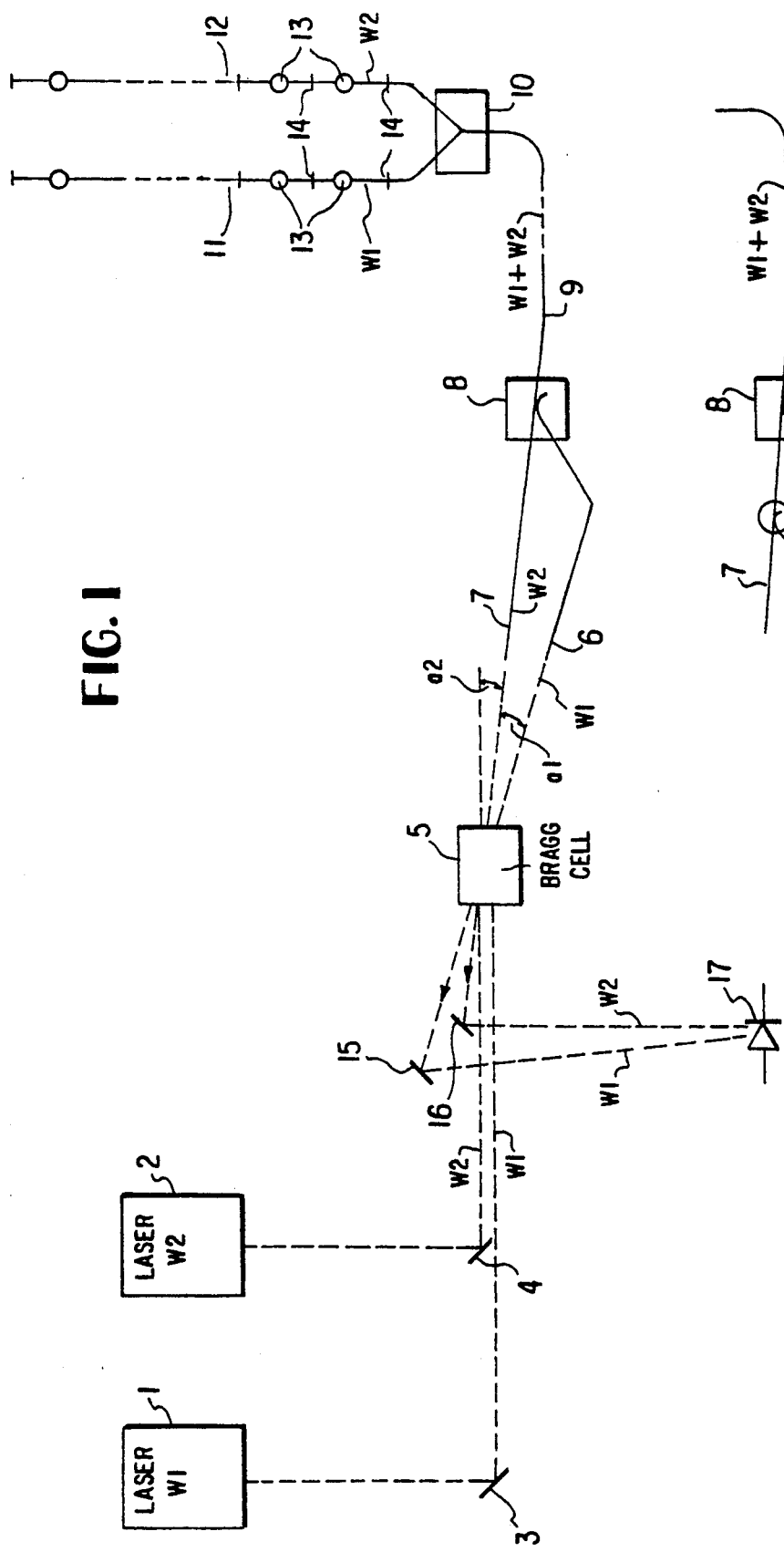
FIGS. 1, 1A, 2, 2A, 3, 3A, 4 and 5 show schematic diagrams of different embodiments of optical sensing systems according to the present invention.

Referring to FIG. 1 of the drawings, the reflectometric optical sensing system illustrated comprises two coherent laser light sources 1, 2 producing light signals having wavelengths w1, w2, respectively. These signals having respective wavelengths which may be of 1300 nm and 1550 nm, for example, are directed by means of reflectors 3 and 4 into a Bragg cell 5 so that the two light beams enter the cell in parallel relationship. The Bragg cell 5 produces angular divergencies a1 and a2, respectively, in the incoming light beams of wavelengths w1 and w2 which, as indicated, are separately launched into two optical fibres 6 and 7 constituting the respective inputs to a wavelength dependent optical coupler 8. The coupler 8 combines the two light signals into a single optical fibre 9 which constitutes the down lead fibre to an optical sensor array with minimum light loss. This down lead optical fibre 9 terminates in a further wavelength dependent optical coupler 10 whereby the incoming light signal of wavelength w1 is directed into one optical sensor array 11 whereas the light signal of wavelength w2 is directed into another similar optical sensor array 12. The Bragg cell allows a variety of functions to be performed, including frequency shifting of the pulses and interlacing of pulses from the lasers.

These sensor arrays each comprise a plurality of interconnected optical sensors 13 adapted to detect changes in parameters (e.g. acoustic pressure) at the positions where the sensors are located. The sensors which may comprise optical fibre elements of the same length are separated by redirecting means formed by partial reflectors 14. These may comprise reflective fibre splices or optical couplers, which cause a small proportion of light signals propagating along the array to be reflected back along the array.

The light of wavelengths w1 and w2 reflected back along the arrays and phase modulated for example in dependence upon the impingement of acoustic pressure waves on one or more of the sensors of the arrays will be re-combined by the optical coupler 10 and then divided again into respective wavelength components by the optical coupler 8. These light components then pass directly back through the Bragg cell 5 in the inoperative state of the cell so that no deflection of the light beam takes place (as illustrated) with the light beams impinging on respective photo-diodes or with the light beams being reflected by reflectors 15 and 16 as illustrated on to a single photo-diode 17. Although the provision of two photo-diodes is more complex it does allow the reflected signals from the two arrays 11 and 12 to be interrogated or analysed separately thus effectively doubling the interrogation frequency. Where a single photo-diode is used the length or duration of the light pulses employed for sensing can be shortened and interleaving techniques can be used in order to increase (e.g. double) the interrogation frequency.

As will be appreciated, the system just above described enables the number of sensors to be doubled by dividing the light signals into two paths along the respective sensor arrays according to the wavelength of the signals with only a small increase in system loss (i.e. about 0.4 dB due to transit through the couplers 8 and 10 and possibly a further loss due to the passage of the light signals through the Bragg cell).

It will readily be understood that the system could be extended by the provision of further lasers having different wavelengths.

Figure 2:
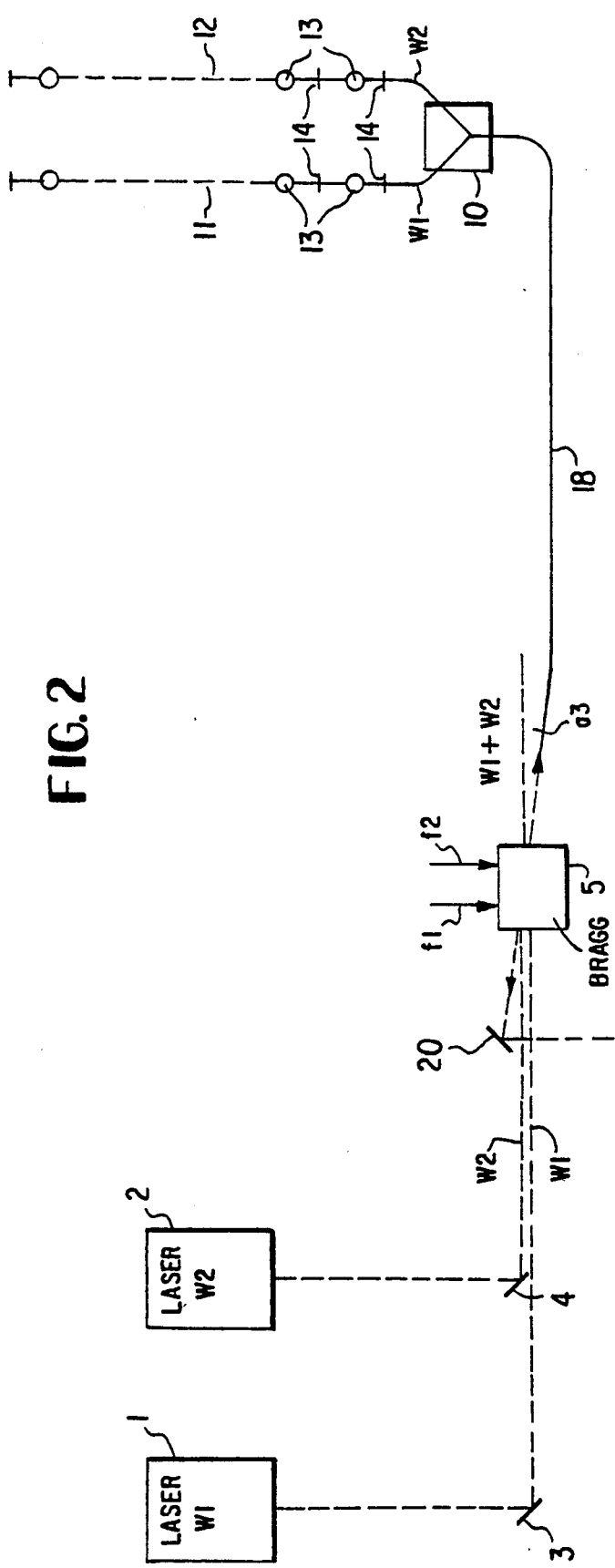

Referring now to FIG. 2 of the drawings, this shows a different optical sensing system according to the invention in which, as in the case of the FIG. 1 embodiment, the light signals of wavelengths w1 and w2 derived from lasers 1 and 2 are arranged to enter the Bragg cell 5 in parallel after being reflected by the reflectors 3 and 4. In this embodiment, however, the Bragg cell 5 is pulsed by means of an electric signal at frequency f1 which produces a light output of wavelength w1 at an angle a3 which is launched into a down lead optical fibre 18. The Bragg cell 5 is then pulsed by an electric signal at frequency f2 so that a light signal at wavelength w2 and angle a3 is produced (i.e f1w1=f2w2) and also launched into the down lead optical fibre 18. The seperation of each of these pulses of frequency f1 and f2 applied to the Bragg cell is equal to one half the transit time for the light signal to travel through the optical hydrophone 13.

The light signals at wavelengths w1 and w2 are directed into the respective sensor arrays 11 and 12 by the wavelength dependent optical coupler 10 which, as already mentioned, re-combines the reflected signals from the arrays which accordingly travel back along the optical fibre 18 to the Bragg cell 5. The reflected signals pass through the Bragg cell in its inoperative condition without deflection and are reflected by reflector 20 on to photo-diode 21.

The system just above described obviates the need for the wavelength dependent optical coupler 8 (FIG. 1).

Figure 3:
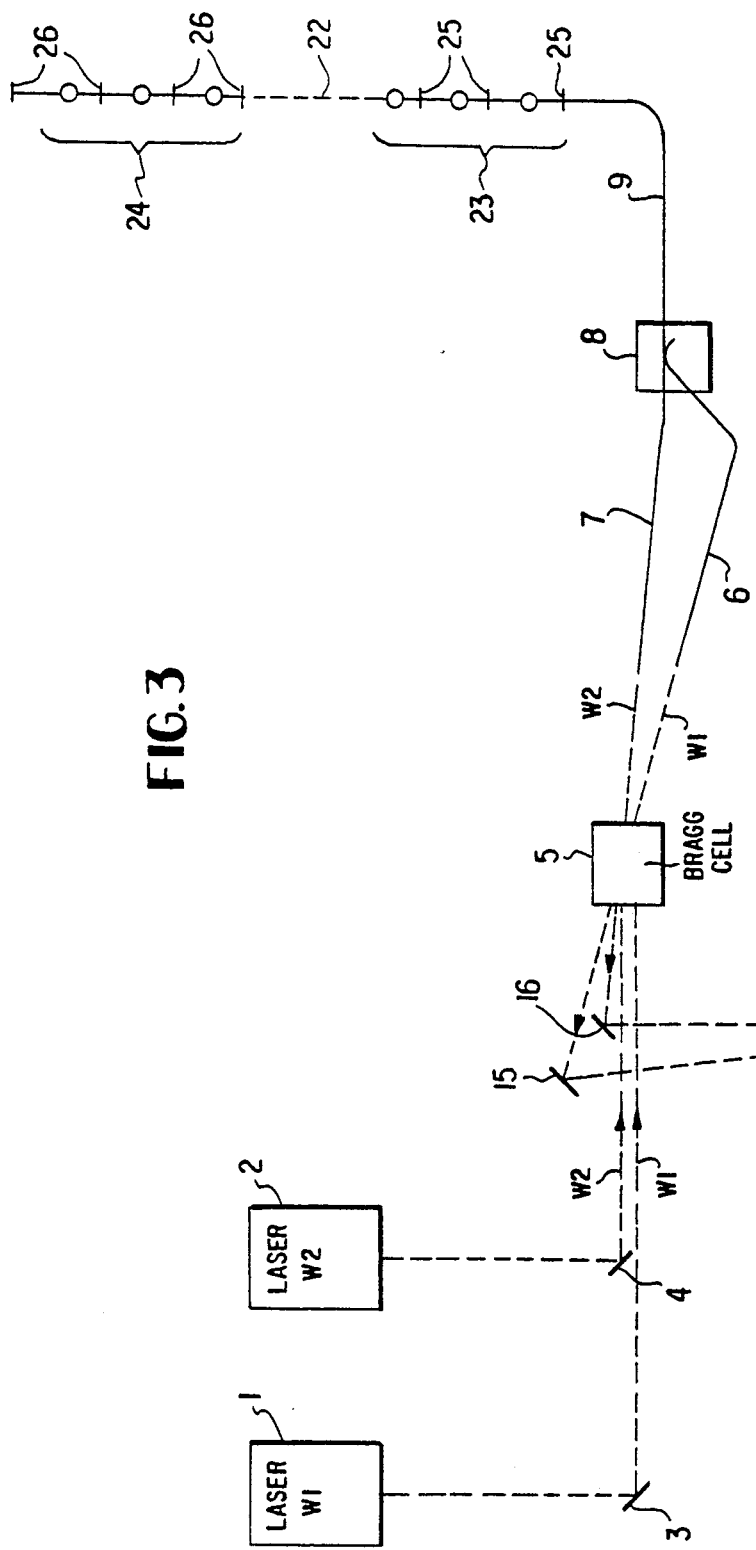

In another embodiment shown in FIG. 3 the optical sensing system is similar to that of FIG. 1 except that instead of providing the wavelength dependent optical coupler 10 (FIG. 1) the two arrays 11 and 12 are arranged in series to provide a single array 22. This array is effectively divided into two equal parts 23 and 24, the first part 23 including partial reflectors 25 which selectively reflect signals at wavelength w1 and transmit at low loss light signals at wavelength w2 whilst the second part of the array includes partial reflectors 26 which selectively reflect signals at wavelength w2 and transmit signals of wavelength w1. Reflectors providing such selectivity may be fabricated from wavelength dependent couplers or optical grating reflectors.

With this system the light travelling to the second part of the array can experience very low loss in the first half which will effectively constitute an extension of the down lead optical fibre 9.

The reflected light transmitted back along the optical fibre 9 will be divided into respective components at wavelengths w1 and w2 as described in connection with FIG. 1 before passing through the Bragg cell and being reflected by reflectors 15 and 16 on to photo-diode 17.

This embodiment enables the number of optical sensors in a single line array to be significantly increased relative to the single wavelength embodiment. However, a second wavelength coupler and two photodiodes could alternatively be used.

Instead of the sensor array 22 being in two discrete parts 23 and 24 the different wavelength partial reflectors 25 and 26 could be alternated along the arrays so that the alternate sensors would effectively be interrogated in respect of the wavelengths w1 and w2. Still further, the need for wavelength dependent coupler 8 could be dispensed with by resorting to the arrangement shown in FIG. 2.

Figure 1A:
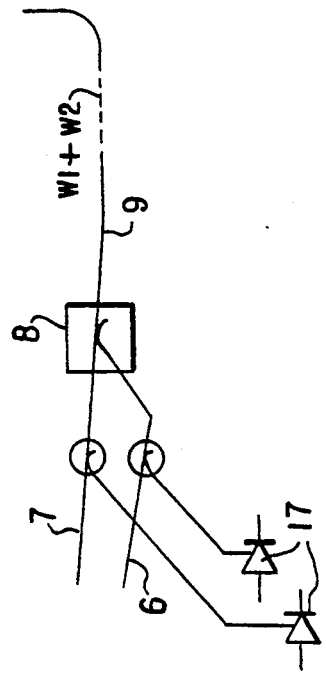
Figure 2A:
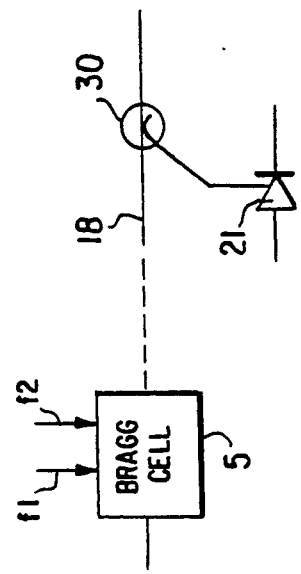
Figure 3A:
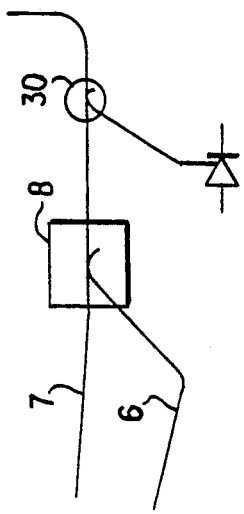

It should be understood that in all the examples given the return path through the Bragg cell can be replaced by pick-off couplers 30 on the downleads leading to photodiodes as shown in FIGS. 1a, 2a and 3a. This allows more flexibility in timing of such systems since return time of the pulses is not now constrained to when the Bragg cell is inoperative. However, loss in the pick-off couplers of 6 dB is inevitable.

Figure 4:
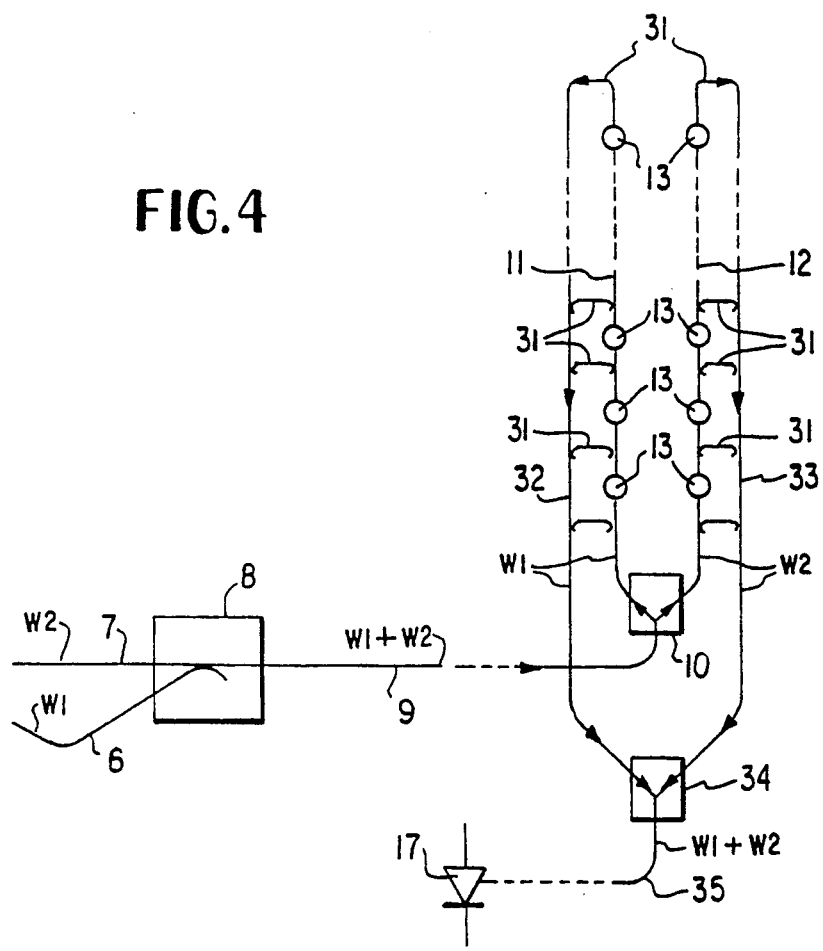
Figure 5:
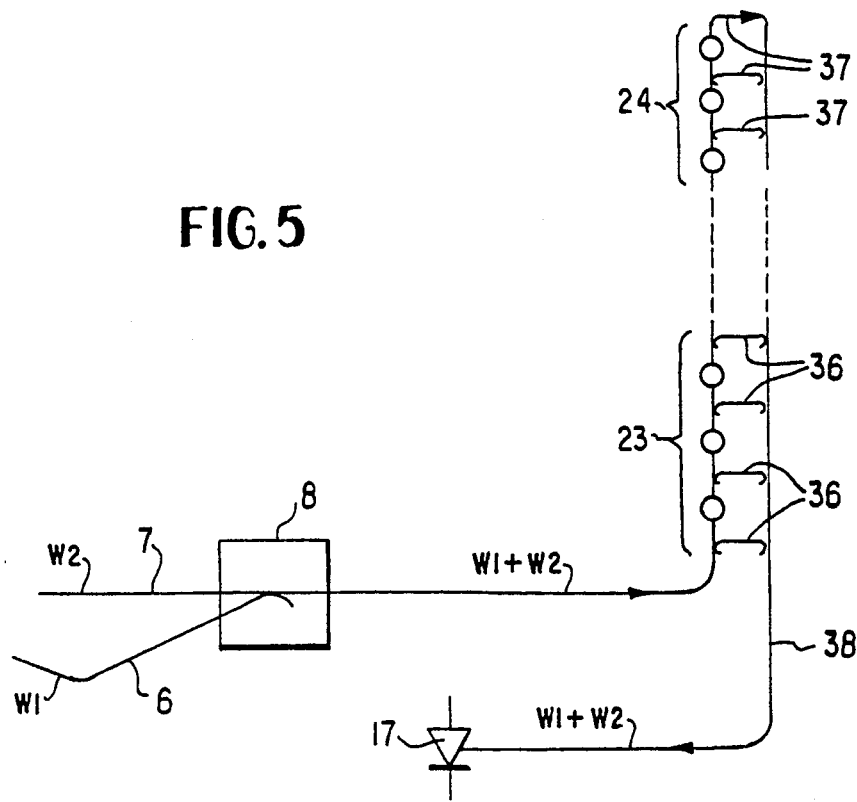

So far embodiments of the invention have been disclosed wherein a single optical fibre is provided for transmitting the signal, which is then returned along the same fibre by reflection at the discontinuities. In FIG. 4 and 5 there is illustrated alternative modifications of the arrangements depicted in FIGS. 1 and 3 respectively.

Referring to FIG. 4 the arrangement is the same as in FIG. 1, except that partial reflectors 14 have been replaced by optical couplers 31. These couple the signals on lines 11 and 12 to return fibres 32 and 33 respectively, which transmit the signals to wavelength dependent optical coupler 34. This combines the signals into a single fibre 35 for transmission direct to the photodiode 17. It will be readily appreciated that the FIG. 2 arrangement can be modified in the same manner.

Referring to FIG. 5, this depicts a similar modification applied to the apparatus of FIG. 3. In this arrangement the wavelength dependent partial reflectors 25 and 26 of FIG. 3 have been replaced by wavelength dependent optical couplers 36 and 37. These couple the signals $W_1$ and $W_2$ respectively to return fibre 38 for transmission directly to photodiode 17.

What we claim is:

1. An optical sensing system comprising a plurality of coherent light sources for producing light signals of different wavelengths, means for combining and launching the light signals of different wavelengths into a single optical fibre leading to an optical sensor array arrangement which includes a plurality of optical sensors separated by redirecting means for directing light signals propagated along the sensor array arrangement along an optical fibre in time displaced relationship to an optical detector arrangement, wherein different one of said redirecting means are associated with light signals from different sources.

2. An optical sensing system as claimed in claim 1, in which the optical sensor array arrangement comprises two arrays connected in parallel into each of which one of said light signals of different wavelengths is respectively directed from the single optical fibre by a wavelength dependent optical coupler.

3. An optical sensing system as claimed in claim 1, in which the optical sensor array arrangement comprises a single array which includes a plurality of optical sensors connected in series and divided into two parts with the sensors in one part being separated by redirecting means which only redirect light signals of one of said different wavelengths but allow continued propagation along the fibre of the light signals of the other of said different wavelengths with low loss and with the sensors of the other part being separated by redirecting means which redirect light signals of said other wavelength.

4. An optical sensing system as claimed in claim 1, in which the optical sensor array arrangement comprises a single array which includes a plurality of optical sensors which are separated by partial redirecting means alternate ones of which redirect light signals of one of said different wavelengths but allow continued propagation along the fibre of the signals of said other wavelength.

5. An optical sensing system as claimed in claim 1, in which the means for combining and launching the light signals of said different wavelengths from said light sources into the single optical fibre comprises a Bragg cell which produces different deflections of said light signals at different wavelengths which are then combined into said single optical fibre by means of a wavelength dependent coupler.

6. An optical sensing system as claimed in claim 5, in which the reflected signals are picked off the return path to the Bragg cell by pick-off coupler means which convey the reflected signals to the optical detector arrangement.

7. An optical sensing system as claimed in claim 1, in which the means for combining and launching the light signals of said different wavelengths into the single optical fibre comprise a Bragg cell which is arranged to be pulsed sequentially at different predetermined frequencies in order to produce like deflections of incoming light signals at different wavelengths.

8. An optical sensing system as claimed in claim 7, in which said reflected signals are picked off the return path to the Bragg cell by pick-off coupler means which convey the reflected signals to the optical detector arrangement.

9. An optical sensing system as claimed in claim 1, wherein said redirecting means comprises partial reflectors for reflecting said light signals back along the single optical fibre to the detector arrangement.

10. An optical sensing system as claimed in claim 2, wherein said redirecting means comprises partial reflectors for reflecting said light signals back along the single optical fibre to the detector arrangement.

11. An optical sensing system as claimed in claim 3, wherein said redirecting means comprises partial reflectors for reflecting said light signals back along the single optical fibre to the detector arrangement.

12. An optical sensing system as claimed in claim 4, wherein said redirecting means comprises partial reflectors for reflecting said light signals back along the single optical fibre to the detector arrangement.

13. An optical sensing system as claimed in claim 1, wherein said redirecting means comprise reflective optical couplers.

14. An optical sensing system as claimed in claim 2, wherein said redirecting means comprise reflective optical couplers.

15. An optical sensing system as claimed in claim 3, wherein said redirecting means comprise reflective optical couplers.

16. An optical sensing system as claimed in claim 4, wherein said redirecting means comprise reflective optical couplers.

17. An optical sensing system as claimed in claim 1, wherein the redirecting means comprise optical coupling means for redirecting light to an optical fibre other than said single optical fibre for transmission to the optical detector arrangement.

18. An optical sensing system as claimed in claim 2, wherein the redirecting means comprise optical coupling means for redirecting light to an optical fibre other than said single optical fibre for transmission to the optical detector arrangement.

19. An optical sensing system as claimed in claim 3, wherein the redirecting means comprise optical coupling means for redirecting light to an optical fibre other than said single optical fibre for transmission to the optical detector arrangement.

20. An optical sensing system as claimed in claim 4, wherein the redirecting means comprise optical coupling means for redirecting light to an optical fibre other than said single optical fibre for transmission to the optical detector arrangement.

21. An optical sensing system as claimed in claim 1, in which said redirected light signals are each respectively directed onto an associated photo-diode detector means.

22. An optical sensing system as claimed in claim 2, in which said redirected light signals are each respectively directed onto an associated photo-diode detector means.

23. An optical sensing system as claimed in claim 3, in which said redirected light signals are each respectively directed onto an associated photo-diode detector means.

24. An optical sensing system as claimed in claim 4, in which said redirected light signals are each respectively directed onto an associated photo-diode detector means.

25. An optical sensing system, comprising:
a plurality of lasers for producing light signals of different wavelengths;
a down-lead optical fibre;
means for combining and launching the light signals of different wavelengths into the down-lead optical fibre;
an optical sensor array arrangement which is operatively connected to the down-lead optical fibre so as to receive the light signals of different wavelengths that are launched into the down-lead optical fibre, the optical sensor array arrangement including a plurality of optical sensors and a plurality of redirecting means for redirecting light, the optical sensors and the redirecting means being connected in at least one series in which optical sensors and redirecting means alternate with each other, each redirecting means redirecting light signals produced by a respective one of the lasers; and
means for detecting light signals that have been redirected by the redirecting means.

26. The optical sensing system of claim 25, further comprising a wavelength dependent optical coupler connected to the down-lead optical fibre, and wherein the optical sensors and the redirecting means are connected in a plurality of series in which optical sensors and redirecting means alternate with each other, each of the series of optical sensors and redirecting means receiving light signals produced by a respective one of the lasers from the wavelength dependent optical coupler.

27. The optical sensing system of claim 25, wherein the optical sensors and the redirecting means are connected in a single series in which optical sensors and redirecting means alternate with each other, the series of optical sensors and redirecting means being connected to the down-lead optical fibre.

28. The optical sensing system of claim 25, wherein the redirecting means comprise partial reflectors.

29. The optical sensing system of claim 28, wherein the means for combining and launching comprises a Bragg cell which produces different deflections of said light signals of different wavelengths and a wavelength dependent coupler which is connected to the down-lead optical fibre and which combines the deflected light signals.

30. The optical sensing system of claim 29, wherein the redirected light signals propagate back through the down-lead optical fibre, the wavelength dependent coupler, and the Bragg cell, and wherein the means for detecting comprises at least one semiconductor element which detects redirected light signals that have passed through the Bragg cell.

31. The optical sensing system of claim 28, wherein the means for combining and launching comprises a Bragg cell which is pulsed sequentially at different frequencies.

32. The optical sensing system of claim 31, wherein the redirected light signals propagate back through the down-lead optical fibre and the Bragg cell, and wherein the means for detecting comprises at least one semiconductor element which detects redirected light signals that have passed through the Bragg cell.

33. The optical sensing system of claim 25, wherein the redirecting means comprise optical couplers, and wherein the means for detecting comprises at least one further optical fibre, each at least one further optical fibre being connected to a plurality of optical couplers and carrying redirected light signals, and at least one semiconductor element which detects redirected light signals that have passed through the at least one further optical fibre.

* * * * *